United States Patent Office 3,189,616
Patented June 15, 1965

3,189,616
PROCESS FOR THE PREPARATION OF PYRAZOLINOBENZIMIDAZOLES
Karl Löffler, deceased, late of Leverkusen, Germany, by Beate Löffler, heir and legal representative; and Karl-Heinz Menzel, both of Leverkusen, Germany, assignors to Agfa Aktiengesellschaft, Leverkusen, Germany, a corporation of Germany
No Drawing. Filed Aug. 1, 1962, Ser. No. 214,144
Claims priority, application Germany, Aug. 11, 1961, A 38,115
6 Claims. (Cl. 260—309.2)

This application relates to a novel process for the preparation of pyrazolinobenzimidazoles.

German Patent 1,070,030 describes a procedure for the preparation of pyrazolinobenzimidazoles in which a 1-(o-aminophenyl)-5-pyrazolone is used as the starting material. The closure of the imidazole ring is achieved by splitting off water which is provided jointly by the o-amino group of the phenyl nucleus and the keto group of the pyrazolone. This reaction is illustrated by the following formula:

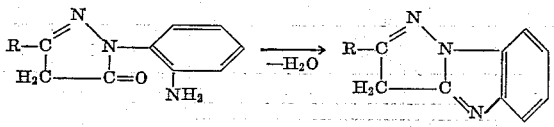

In this formula, R represents a monovalent organic radical, such as an alkyl, aryl, aralkyl or heterocyclic radical.

This procedure suffers from the disadvantage that the starting materials are not readily accessible; besides, the yields are somewhat low and the end products are quite difficult to purify. It is accordingly an object of this invention to provide an improved process for the preparation of pyrazolinobenzimidazoles. Other objects will be apparent from the following description.

We have found that the pyrazolinobenzimidazoles can be prepared in an especially advantageous manner by using as the starting materials 1-(o-aminophenyl)-5-iminopyrazolones or its tautomer 1-(o-aminophenyl)-5-aminopyrazole, and closing the imidazole ring by splitting off one ammonia molecule, which is provided jointly, by the o-amino group of the phenyl nucleus and the amino group of the pyrazolone ring. This reaction is illustrated by the following schematic equation, which also demonstrates in graphic form the possible tautomerism of the pyrazolone ring system.

In these formulae, R represents a long chain alkyl group having from 9 to 17 carbon atoms; an aryl group such as a phenyl group or a phenylene group which may be further substituted by a substituent which renders the compound fast to diffusion or a heterocyclic group, such as a benzofurane nucleus; Y and X represent hydrogen, a lower alkyl group, such as methyl or ethyl, a lower alkoxy group, such as methoxy or ethoxy, carboxy, sulfo or halogen, such as chlorine or bromine.

Ring closure can be effected and the ammonia split off from the above pyrazolones in a simple manner by heating the said pyrazolones in the presence of acids, preferably at a temperature range of approximately 100–120° C. This procedure makes it possible to prepare the pyrazolinobenzimidazole in an especially smooth manner and in an especially pure form.

The new synthesis offers also additional advantages which are connected with the preparation of the necessary intermediates. The latter are obtained in a conventional manner by condensing β-ketonitriles of the formula $RCOCH_2CN$ with 2-nitrophenylhydrazine derivatives to yield 1-(2-nitrophenyl)-5-iminopyrazolone. The nitro group present in these compounds is then reduced to the amino group. In most instances, it is not necessary to isolate the hydrazone derivatives which may be formed as intermediates.

These pyrazolinobenzimidazoles are intermediates for the preparation of dyes, for example, of azo dyes. The pyrazolinobenzimidazoles are of a special interest as color couplers for photographic color images by chromogene development utilizing a photographic developer solution containing an aromatic primary amino developing agent. The color formers are preferably incorporated in the photographic silver halide emulsions which are used in the production of these color pictures. Most suitable for this purpose are those pyrazolinobenzimidazoles which by the introduction of alkyl radicals with at least 9 carbon atoms or similar substituents have been rendered fast to diffusion so that they will remain in the silver halide emulsion during processing. Pyrazolinobenzimidazoles which are fast to diffusion correspond to compounds of the above formulae in which R represents either an alkyl group with at least 9 carbon atoms or a phenyl radical which is substituted additionally by a group capable of preventing diffusion.

The preparation of pyrazolinobenzimidazoles fast to diffusion proceeds especially easy by the use of our procedure. The corresponding β-ketonitriles are readily accessible by reacting suitable esters with ketonitriles. The higher reactivity of the β-ketonitrile and the relatively low solubility in organic solvents of the intermediate 5-

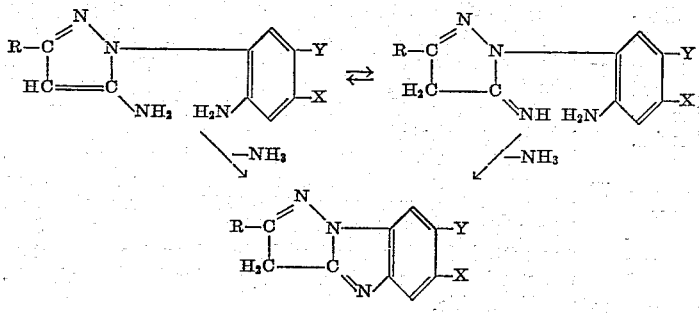

aminopyrazoles, yields the pyrazolinobenzimidazole in purities and yields which are superior to those obtained by the older procedure which utilizes β-keto esters as the starting materials. The details of the synthesis will be further illustrated by the following examples.

PREPARATION OF STEAROYLACETONITRILE

A mixture of 312 grams of ethyl stearate, 105 mls. of acetonitrile, 250 mls. of pyridine and 115 grams of powdered sodium methylate (sodium methoxide) was heated to 90° C. and stirred under reflux in the absence of moisture. After 1½ hours of stirring, the contents of the flask had thickened to a paste-like consistency; the contents of the flask were kept without stirring for an additional 30 minutes at 90° C. After cooling, the reaction mixture was broken up into a crude powder, stirred with 5 liters of ice water and acidified with hydrochloric acid using Congo red paper as the indicator. The mixture was filtered through a Büchner funnel, washed successively with 5 percent hydrochloric acid, and with water and finally dried. The product was twice recrystallized from methanol and yielded the β-ketonitrile in the form of fluffy white powder. Yield 190 grams; M.P. 77–78° C.

The following products were obtained in an analogous manner:

|  | M.P., ° C. |
|---|---|
| Undecoylacetonitrile | 65–66 |
| Myristoylacetonitrile | 76–77 |
| Palmitoylacetonitrile | 84–85 |
| 3-cyanacetophenyl-dodecylsulfone | 93–94 |

*Example I.—2-heptadecyl-pyrazolo[1,5a]benzimidazole*

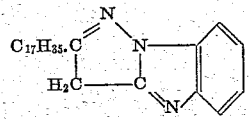

19 grams of 2-nitrophenylhydrazine-hydrochloride and 30.7 grams of stearoylacetonitrile were heated under reflux for 3½ hours together with 170 ml. of ethanol and a solution of 8.2 grams of sodium acetate in 20 ml. of water. At the end of this heating period, 10 ml. of a 40 percent aqueous sodium hydroxide solution was added and heating continued for 30 more minutes. The 1-(2′-nitrophenyl)-3-heptadecyl-5-aminopyrazole which precipitated after cooling was filtered off and washed with methanol until the wash liquid was colorless and then dried. 43 grams of a greenish-yellow nitro product melting at 79–80° C. were thus obtained. This product was reduced with hydrogen in methanol at 60° C. using Raney nickel as the catalyst to form the amino derivative. The catalyst was filtered off, the filtrate reduced to ⅓ of its original volume and stirred into 250 ml. of water to precipitate the amino compound. The latter was filtered off and washed with water. The white wax-like amine thus obtained was heated without further purification for 2 hours at 110° C. with 55 ml. of a 20 percent sulfuric acid. The mixture was allowed to cool, filtered, washed with water, dissolved in 250 ml. of hot ethanol and precipitated with 500 ml. of a 3 percent aqueous sodium acetate solution. The resulting product was washed with water, dried and recrystallized from 250 ml. of acetone; 35 grams of 2-heptadecyl-pyrazolino-benzimidazole having an M.P. of 119–120° C. was obtained in the form of a white, loosely, powdered material. The actual yield was 88.4 percent of the theoretical yield based on the amount of 2-nitrophenylhydrazine hydrochloride which had been used as a starting material.

Analysis $C_{26}H_{41}N_3$:

| Percent | C | H | N |
|---|---|---|---|
| Calculated | 79.0 | 10.4 | 10.6 |
| Found | 79.0 | 10.6 | 10.5 |

*Example II.—2-heptadecyl-6-trifluoromethyl-pyrazolo[1,5-a]benzimidazole*

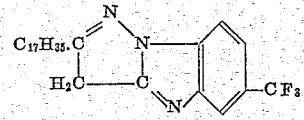

Eleven grams of 3-nitro-4-hydrazino-benzotrifluoromethyl and 15.3 grams of stearoylacetonitrile were heated together in the form of a fusion mixture on a steam bath. The resulting product was dissolved in a solution of 3 grams of sodium in 130 ml. of methanol and heated under reflux for 20 minutes. After cooling, the precipitated 1-(2′-nitro-4′-trifluoromethyl-phenyl)-3-heptadecyl-5-amino-pyrazole was filtered off and washed with 100 ml. of methanol. Yield of 23.1 grams; M.P. 100–101° C. The nitro product was reduced in 150 ml. of methanol with hydrogen using Raney nickel as the catalyst to the corresponding amine. The Raney nickel was filtered off and the methanol removed by distillation. The residue was heated for 3 hours under reflux with a mixture of 20 ml. of propanol and 15 ml. of 20 percent hydrochloric acid. The mixture was then allowed to cool, the precipitate which had been formed was filtered off and washed successively with an aqueous sodium acetate solution and water. The washed product was recrystallized from 70 ml. of methanol; 15.9 grams of a pure white product melting at 158–159° C. was obtained. The actual yield was 62.3 percent of theory based on the amount of 3-nitro-4-hydrazino-benzotrifluoromethyl which had been used as the starting material.

Analysis $C_{27}H_{40}N_3F_3$:

| Percent | C | H | N |
|---|---|---|---|
| Calculated | 70.0 | 8.65 | 9.08 |
| Found | 69.6 | 8.65 | 9.20 |

*Example III.—2-heptadecyl-(6-N,N-dimethylsulfonamido)-pyrazolo[1,5-a]benzimidazole*

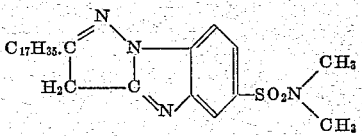

Thirteen grams of 3-nitro-4-hydrazino-benzosulfon-N,N-dimethylamide and 15.4 grams of stearoylacetonitrile were heated with stirring for 2 hours to a temperature of 125° C. After cooling, the clear melt thus obtained was mixed with 100 ml. of methanol and 30 ml. of a 5 percent solution of sodium methoxide in methanol. The mixture was heated under reflux for 20 minutes on a steam bath. The thick crystal dispersion was stirred with additional methanol, filtered off through a Büchner funnel and washed with methanol. The intermediate 2′-nitro-5-aminopyrazole derivative which melted at 114–116° C. was dissolved without intermediate drying in 150 ml. of methanol and hydrogenated at 75° C. by the use of Raney nickel to form the diamino derivative. The hot solution was filtered to remove the Raney nickel. After cooling, white crystals melting at 102–103° C. were obtained. The diamino derivative was stirred for 2 hours at 120° C. with 90 ml. of 20 percent sulfuric acid. The product which precipitated after cooling was filtered through a Büchner funnel, thoroughly washed with water and subsequently digested with 100 ml. of hot methanol. A pure white product melting at 182–183° C. was obtained. The yield was 20.8 grams, which corresponds to 82.8 percent of the theoretical yield based on the amount of the starting material 3-nitro-4-hydrazino-benzene-dimethylsulfonamide.

Analysis $C_{28}H_{46}O_2N_4S$:

| Percent | C | H | O | N | S |
|---|---|---|---|---|---|
| Calculated | 66.9 | 9.16 | 6.37 | 11.16 | 6.37 |
| Found | 66.8 | 9.33 | 6.43 | 11.49 | 6.65 |

The following pyrazolinobenzimidazole derivatives were prepared in an analogous manner:

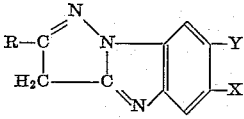

| R | X | Y | M.P., °C. |
|---|---|---|---|
| —$C_{15}H_{31}$ | —$CF_3$ | —H | 156–158 |
| —$C_{13}H_{27}$ | —$CF_3$ | —H | 165–167 |
| —$C_{11}H_{23}$ | —$CF_3$ | —H | 172–173 |
| —$C_{17}H_{35}$ | —$CH_3$ | —H | 123–125 |
| —$C_{17}H_{35}$ | —$OCH_3$ | —H | 114–116 |
| —$C_{17}H_{35}$ | —H | —Cl | 140–146 |
| —$C_{17}H_{35}$ | —COOH | —H | 260 |
| —$C_{17}H_{35}$ | —$SO_3H$ | —H | 260 |
| —$C_6H_5$ | —H | —H | 260 |
| —$C_6H_5$ | —$CF_3$ | —H | 244–247 |
| 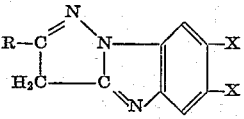 | —$CF_3$ | —H | 85–87 |
| 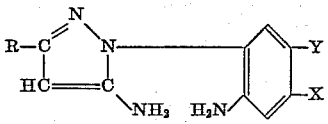 | —$CF_3$ | —H | 157–159 |
| (benzofuryl) | —$CF_3$ | —H | 268 |

Various modifications of this invention will occur to persons skilled in the art. We, therefore, do not intend to be limited in the patent granted except as necessitated by the appended claims.

We claim:

1. A procedure for the preparation of a pyrazolinobenzimidazole having the following formula:

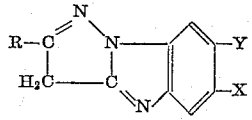

wherein R is a member of the group consisting of alkyl having from 9 to 17 carbon atoms, phenyl, dodecylmercaptophenyl, dodecylsulfonylphenyl and benzofuryl; X is a member of the group consisting of hydrogen, lower alkyl, lower alkoxy, carboxy, sulfo, trifluoromethyl and dimethylsulfonamido; and Y is a member selected from the class consisting of hydrogen and halogen; which comprises heating under atmospheric pressure at a temperature ranging from 100–120 C., and in the presence of a molar excess of a dilute inorganic acid, a compound having the following formula:

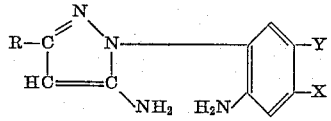

wherein R, X and Y have the values given above, for a time sufficient to split off ammonia and effect closure of the benzimidazole ring, wherein the heating time ranges from 2 to 3 hours.

2. A procedure for the preparation of a pyrazolinobenzimidazole having the following formula:

wherein R is a member of the group consisting of alkyl having from 9 to 17 carbon atoms, phenyl, dodecylmercaptophenyl, dodecylsulfonylphenyl and benzofuryl; X is a member of the group consisting of hydrogen, lower alkyl, lower alkoxy, carboxy, sulfo, trifluoromethyl and dimethylsulfonamido; and Y is a member selected from the class consisting of hydrogen and halogen; which comprises heating under atmospheric pressure at a temperature ranging from 100–120° C., and in the presence of a molar excess of a dilute inorganic acid selected from the group consisting of sulfuric acid and hydrochloric acid, a compound having the following formula:

wherein R, X and Y have the values given above, for a time sufficient to split off ammonia and to effect closure of the benzimidazole ring, wherein the heating time ranges from 2 to 3 hours.

3. A process according to claim 2 wherein said dilute inorganic acid has a concentration of about 20%.

4. A process of preparing 2-heptadecyl-pyrazole (1,5-a) benzimidazole which comprises heating under atmospheric pressure 1-(2'-aminophenyl)-3-heptadecyl-5-aminopyrazole together with a sulfuric acid solution at a temperature ranging from 100–120° C. for a time sufficient to split off ammonia and to effect closure of the imidazole ring, said time being about 2 hours.

5. A process of preparing 2-heptadecyl-6-trifluoromethylpyrazolo (1,5-a) benzimidazole which comprises heating under reflux and at ambient atmospheric pressure 1-(2'-amino-4-trifluoromethyl-phenyl)-3-heptadecyl-5-amino-pyrazole together with a hydrochloric acid solution at a temperature ranging from 100–120° C. for a time sufficient to split off ammonia and to effect closure of the imidazole ring, said time being about 3 hours.

6. A process of preparing 2-heptadecyl-(6-N,N-dimethylsulfonamido) (pyrazolo (1,5-a) benzimidazole which comprises heating at a temperature ranging from 100–120° C. and at ambient atmospheric pressure 1-(2'-amino-4'-N,N-dimethylsulfonamidophenyl)-3-heptadecyl-5-aminopyrazole together with dilute sulfuric acid for a time sufficient to split off ammonia and to effect closure of the imidazole ring, said time being about 2 hours.

References Cited by the Examiner

UNITED STATES PATENTS 3,061,432  10/62  Menzel et al. _____ 260—309.2

FOREIGN PATENTS 58,165  7/91  Germany.

OTHER REFERENCES

Carlin et al., Jour. Amer. Chem. Soc., vol. 72, pp. 793–801 (1950).

Hollins, The Synthesis of Nitrogen Ring Compounds, pages 177–9, N.Y., Van Nostrand, 1924.

Jacobs in: Elderfield Heterocyclic Compounds, vol. 5, page 97, N.Y., Wiley, 1957.

Sumpter et al., Heterocyclic Compounds With Indole and Carbazole Systems, pp. 78–79, New York, Interscience, 1954.

WALTER A. MODANCE, *Primary Examiner.*

D. T. McCUTCHEN, NICHOLAS S. RIZZO, *Examiners.*